United States Patent
Jang et al.

(10) Patent No.: US 11,544,002 B2
(45) Date of Patent: Jan. 3, 2023

(54) MEMORY SYSTEM, MEMORY CONTROLLER AND OPERATING METHOD THEREOF

(71) Applicant: SK hynix Inc., Gyeonggi-do (KR)

(72) Inventors: Dae Hoon Jang, Gyeonggi-do (KR); Dong Ham Yim, Gyeonggi-do (KR); Young Hoon Cha, Gyeonggi-do (KR); Young Guen Choi, Gyeonggi-do (KR); Jeong Sun Park, Seoul (KR); Cheon Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 404 days.

(21) Appl. No.: 16/823,619

(22) Filed: Mar. 19, 2020

(65) Prior Publication Data

US 2021/0103405 A1 Apr. 8, 2021

(30) Foreign Application Priority Data

Oct. 7, 2019 (KR) .................. 10-2019-0123643

(51) Int. Cl.
*G06F 3/06* (2006.01)
*G06F 11/07* (2006.01)

(52) U.S. Cl.
CPC .......... *G06F 3/0659* (2013.01); *G06F 3/0604* (2013.01); *G06F 3/0673* (2013.01); *G06F 11/073* (2013.01); *G06F 11/0751* (2013.01); *G06F 11/0772* (2013.01)

(58) Field of Classification Search
CPC .... G06F 3/0659; G06F 3/0604; G06F 3/0673; G06F 11/073; G06F 11/0751; G06F 11/0772; G06F 3/0619; G06F 3/0658; G06F 3/0679; G06F 11/1048; G06F 13/1668; G06F 13/1657; G06F 3/0631; G06F 3/0683
USPC .......................................................... 714/57
See application file for complete search history.

(56) References Cited

U.S. PATENT DOCUMENTS

| | | | |
|---|---|---|---|
| 2015/0379670 A1* | 12/2015 | Koker ........................ | G06T 1/20 345/502 |
| 2016/0057437 A1* | 2/2016 | Jeong ................... | H04N 19/426 375/240.25 |
| 2018/0196461 A1* | 7/2018 | Zhou ...................... | G06F 1/3284 |

FOREIGN PATENT DOCUMENTS

KR 10-2014-0128821 11/2014
KR 10-2018-0031853 3/2018

OTHER PUBLICATIONS

Wikipedia "SIMD" page, retrieved from https://en.wikipedia.org/wiki/Single_instruction,_multiple_data (Year: 2022).*

(Continued)

*Primary Examiner* — Yair Leibovich
(74) *Attorney, Agent, or Firm* — IP & T Group LLP

(57) ABSTRACT

A memory system, a memory controller and an operating method are disclosed. When a target command which instructs an operation of writing target data to a memory device is received from a host, the target data is divided into data units, and a first data unit among the data units is controlled such that the entire first data unit is written to the memory device or none of the first data unit is written to the memory device. As a consequence, it is possible to write data in specific units in a memory system using a multi-core.

13 Claims, 17 Drawing Sheets

(56) References Cited

OTHER PUBLICATIONS

Wikipedia "MBR" page, retrieved from https://en.wikipedia.org/wiki/Memory_buffer_register (Year: 2022).*

* cited by examiner

MEMORY SYSTEM, MEMORY CONTROLLER AND OPERATING METHOD THEREOF

CROSS-REFERENCE TO RELATED APPLICATION

The present application claims priority under 35 U.S.C. 119(a) to Korean Patent Application No, 10-2019-0123643, filed in the Korean Intellectual Property Office on Oct. 7, 2019, which is incorporated herein by reference in its entirety.

BACKGROUND

1. Technical Field

Various embodiments generally relate to a memory system, a memory controller and an operating method.

2. Related Art

A memory system operating as a storage device stores data based on a request of a host, such as a computer, a mobile terminal such as a smartphone or a tablet, or any of various other electronic devices. The memory system may be of a type which stores data in a magnetic disk, such as a hard disk drive (HDD), or a type which stores data in a nonvolatile memory, such as a solid state drive (SDD), a universal flash storage (UFS) device or an embedded MMC (eMMC) device.

The memory system may further include a memory controller for controlling a memory device. The memory controller may receive a command from the host, and may perform or control an operation for reading, writing or erasing data with respect to a volatile memory or a nonvolatile memory in the memory system, based on the received command. The memory controller may drive firmware for performing logical calculations to execute or control these operations.

The memory controller drives the firmware for performing the above-described logical calculations, through a processor therein. The processor may be a multi-core processor including a plurality of cores which operate in parallel.

SUMMARY

Various embodiments are directed to a memory system, a memory controller and an operating method, capable of writing data in a specific unit in a memory system using a multi-core.

Also, various embodiments are directed to a memory system, a memory controller and an operating method, capable of ensuring that data is written while its atomicity is maintained when an SPO occurs in a memory system using a multi-core.

In one aspect, embodiments of the disclosure may provide a memory system including: a memory device including a plurality of memory areas; and a memory controller configured to control the memory device.

The memory controller may include one main core.

The memory controller may include a plurality of sub-cores which communicate with the main core and control write operations on one or more memory areas among the plurality of memory areas.

The main core may receive a target command for an operation of writing target data to the memory device, from a host.

In response to the target command, the main core may divide the target data into data units each having a size equal to or less than a threshold size, and may allocate the data units to the plurality of sub-cores.

The memory controller may control a first data unit among the data units such that the entire first data unit is written to the memory device or none of the first data unit is written to the memory device.

The memory controller may write the first data unit to the plurality of memory areas by distributing the first data unit as a plurality of sub-data units. The main core may divide the first data unit into a plurality of sub-data units and distribute the sub-data unit. The sub-cores may write the distributed sub-data units to the corresponding memory areas.

A first sub-core among the plurality of sub-cores may write a first sub-data unit among the plurality of sub-data units to the corresponding memory area which is controlled by the first sub-core.

When writing the first sub-data unit to the target memory area, the first sub-core may write an identification of the target command and a size value of the first sub-data unit.

The first sub-core may report the identification of the target command to the main core when an uncorrectable error is detected in a piece of the first sub-data unit during a sudden power-off recovery (SPQR) operation.

Based on the identification of the target command reported from the first sub-core, the main core may instruct a second sub-core different from the first sub-core among the plurality of sub-cores, to unmap a second sub-data unit which is written to a memory area controlled by the second sub-core, among the plurality of sub-data units.

In another aspect, embodiments of the disclosure may provide a memory controller including: a memory interface configured to communicate with a memory device including a plurality of memory areas and a control circuit configured to control the memory device.

The control circuit may include one main core.

The control circuit may include a plurality of sub-cores which communicate with the main core and control write operations on one or more memory areas among the plurality of memory areas.

The main core may receive a target command for an operation of writing target data to the memory device, from a host.

In response to the target command, the main core may divide the target data into data units each having a size equal to or less than a threshold size, and may allocate the data units to the plurality of sub-cores.

The control circuit may control a first data unit among the data units, such that the entire first data unit is written to the memory device or none of the first data unit is written to the memory device.

The control circuit may write the first data unit to the plurality of memory areas by distributing the first data unit as a plurality of sub-data units. The main core may divide the first data unit into a plurality of sub-data units and distribute the sub-data unit. The sub-cores may write the distributed sub-data units to the corresponding memory areas.

A first sub-core among the plurality of sub-cores may write a first sub-data unit among the plurality of sub-data units to a target memory area which is controlled by the first sub-core.

When writing the first sub-data unit to the target memory area, the first sub-core may write an identification of the target command and a size value of the first sub-data unit.

The first sub-core may report the identification of the target command to the main core when an uncorrectable error is detected in a piece of the first sub-data unit during a sudden power-off recovery (SPQR) operation.

Based on the identification of the target command reported from the first sub-core, the main core may instruct a second sub-core different from the first sub-core among the plurality of sub-cores, to unmap a second sub-data unit which is written to a memory area controlled by the second sub-core, among the plurality of sub-data units.

In still another aspect, embodiments of the disclosure may provide a method for operating a memory controller including one main core and a plurality of sub-cores.

The plurality of sub-cores may communicate with the main core, and may control data write operations for some among a plurality of memory areas.

The method for operating a memory controller may include receiving, by the main core, a target command from a host. The target command may be a command for an operation of writing target data to a memory device.

The method for operating a memory controller may include dividing, by the main core, the target data into data units each having a size equal to or less than a threshold size and allocating, by the main core, the data units to the plurality of sub-cores.

The method for operating a memory controller may include controlling, by the sub-cores, a first data unit among the data units, such that the entire first data unit is written to the memory device or none of the first data unit is written to the memory device.

In one aspect, embodiments of the disclosure may provide a memory system including: first and second memory areas; a main controller configured to divide a write data unit into at least first and second sub-data units; and first and second sub-controllers configured to control the first and second memory areas to store therein the first and second sub-data units respectively.

Each of the first and second sub-controllers may be further configured to control the corresponding first or second memory area to store therein, along with the corresponding first or second sub-data unit, identification of the write data unit.

The first sub-controller may be further configured to report, when an error in the first sub-data unit is detected during a sudden power off recovery operation, the identification to the second sub-controller.

The second sub-controller may be further configured to unmap, during the sudden power off recovery operation, the second sub-data unit based on the reported identification, thereby maintaining atomicy of the write data unit.

According to embodiments of the disclosure, it is possible to write data in a specific unit in a memory system using a multi-core.

Also, according to embodiments of the disclosure, it is possible to ensure that data is written while its atomicity is maintained when an SPO occurs in a memory system using a multi-core.

DETAILED DESCRIPTION

Various embodiments of the disclosure are described in detail below with reference to the accompanying drawings. Throughout the specification, reference to "an embodiment," "another embodiment" or the like is not necessarily to only one embodiment, and different references to any such phrase are not necessarily to the same embodiment(s). Similarly, the indefinite articles "a" and "an" mean one or more, unless stated otherwise or it is clear from the context that only one is intended.

Figure 1:
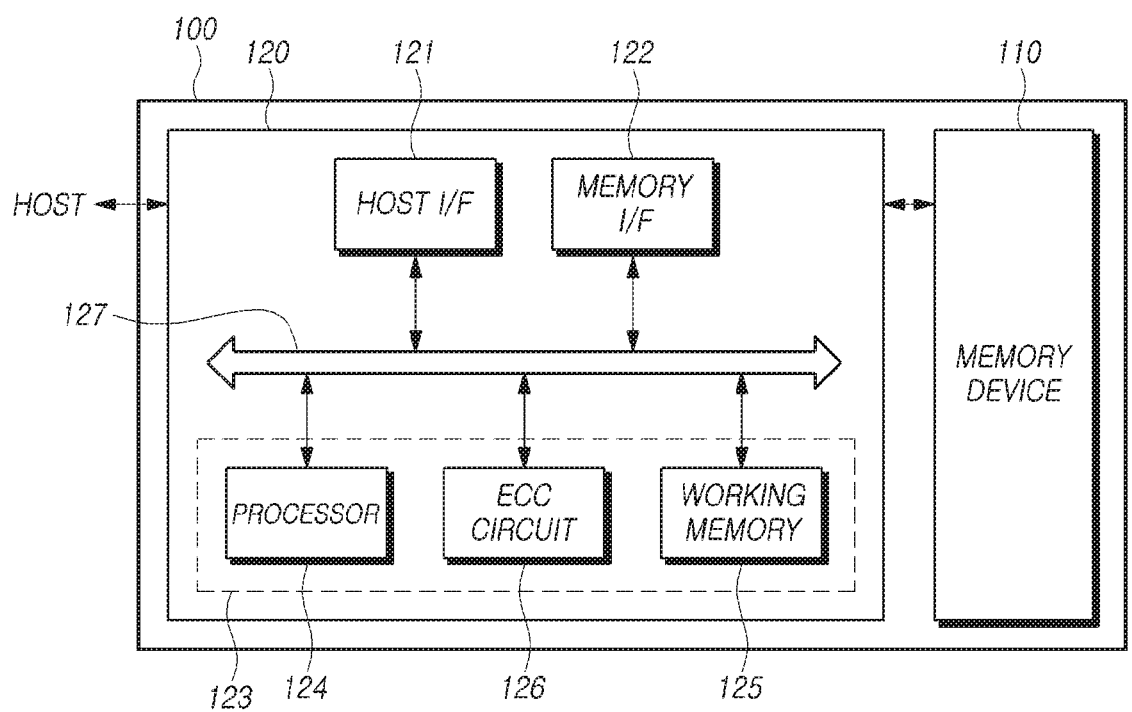
FIG. 1 is a schematic diagram illustrating a configuration of a memory system in accordance with an embodiment of the disclosure.

FIG. 1 is a diagram schematically illustrating a configuration of a memory system 100 in accordance with an embodiment of the disclosure.

Referring to FIG. 1, the memory system 100 may include a memory device 110 which stores data, and a memory controller 120 which controls the memory device 110.

The memory device 110 includes a plurality of memory blocks, and operates in response to the control of the memory controller 120. Operations of the memory device 110 may include, for example, a read operation, a program operation (also referred to as a write operation) and an erase operation.

The memory device 110 may include a memory cell array including a plurality of memory cells (also simply referred to as "cells") which store data. Such a memory cell array may be disposed in memory blocks.

For example, the memory device 110 may be realized as any of various types such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and/or a spin transfer torque random access memory (STT-RAM).

The memory device 110 may be realized in a three-dimensional array structure. Embodiments of the disclosure may be applied to not only a flash memory device in which a charge storage layer is configured by a conductive floating gate but also a charge icy trap flash (CTF) in which a charge storage layer is configured by a dielectric layer.

The memory device 110 is configured to receive a command, an address and the like from the memory controller 120 and access a region in the memory cell array which is selected by the address. In other words, the memory device 110 may perform an operation corresponding to the command for a region selected by the address.

For example, the memory device 110 may perform a program operation, a read operation and an erase operation. In the program operation, the memory device 110 may program data in a region selected by the address. In the read operation, the memory device 110 may read data from a region selected by the address. In the erase operation, the memory device 110 may erase data stored in a region selected by the address.

The memory controller 120 may control write (program), read, erase and background operations for the memory device 110. For example, the background operation may include at least one among a garbage collection (GC) operation, a wear leveling (WL) operation, a bad block management (BBM) operation, and the like.

The memory controller 120 may control the operation of the memory device 110 according to a request of a host. The memory controller 120 may also control the operation of the memory device 110 even in the absence of a request of the host.

The memory controller 120 and the host may be separate components. Alternatively, the memory controller 120 and the host may be integrated into a single device. By way of example, the following description is given in the context of the memory controller 120 and the host being separate components.

Referring to FIG. 1, the memory controller 120 may include a memory interface 122 and a control circuit 123, and may further include a host interface 121.

The host interface 121 provides an interface for communication with the host.

When receiving a command from the host, the control circuit 123 may receive the command through the host interface 121, and then, may perform an operation of processing the received command.

The memory interface 122 is coupled with the memory device 110 and thereby provides an interface for communication with the memory device 110. That is to say, the memory interface 122 may be configured to provide the interface between the memory device 110 and the memory controller 120 in response to the control of the control circuit 123.

The control circuit 123 performs the general control operations of the memory controller 120, thereby controlling the operations of the memory device 110. To this end, for instance, the control circuit 123 may include at least one of a processor 124 and a working memory 125, and as the case may be, may further include an error detection and correction circuit (ECC circuit) 126.

The processor 124 may control general operations of the memory controller 120, and may perform a logic calculation. The processor 124 may communicate with the host through the host interface 121, and may communicate with the memory device 110 through the memory interface 122.

The processor 124 may perform the function of a flash translation layer (FTL). The processor 124 may translate a logical block address (LBA) provided by the host, into a physical block address (PBA), through the flash translation layer (FTL). The flash translation layer (FTL) may receive the logical block address (LBA) and translate the received logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 is configured to randomize data received from the host. For example, the processor 124 may randomize data received from the host, by using a randomizing seed. Randomized data as data to be stored is provided to the memory device 110 and is programmed to the memory cell array.

The processor 124 is configured to derandomize data icy received from the memory device 110, in a read operation. For example, the processor 124 may derandomize data received from the memory device 110, by using a derandomizing seed. Derandomized data may be outputted to the host.

The processor 124 may control the operation of the memory controller 120 by executing firmware. In other words, in order to control general operations of the memory controller 120 and perform a logic calculation, the processor 124 may execute (drive) firmware loaded to the working memory 125 upon booting.

The firmware as a program to be executed in the memory system 100 may include various functional layers.

For example, the firmware may include at least one among a flash translation layer (FTL) which performs a translating function between a logical address requested to the memory system 100 from the host and a physical address of the memory device 110, a host interface layer (HIL) which serves to analyze a command requested to the memory system 100 as a storage device from the host and transfers the command to the flash translation layer (FTL), and a flash interface layer (FIL) which transfers a command instructed from the flash translation layer (FTL) to the memory device 110.

For instance, such firmware may be stored in the memory device 110 and then be loaded to the working memory 125.

The working memory 125 may store a firmware, a program code, a command and data to drive the memory controller 120. The working memory 125, for example, as a volatile memory, may include at least one among an SRAM (static RAM), a DRAM (dynamic RAM) and an SDRAM (synchronous DRAM).

The error detection and correction circuit 126 may be configured to detect an error bit in target data and correct the detected error bit, by using an error correction code. Here, the target data may be, for example, data stored in the working memory 125, data read from the memory device 110, or the like.

The error detection and correction circuit 126 may be realized to decode data by using an error correction code. The error detection and correction circuit 126 may be realized by any of various code decoders. For example, a decoder which performs unsystematic code decoding or a decoder which performs systematic code decoding may be used.

For example, the error detection and correction circuit 126 may detect error bit(s) for each read data, in the unit of sector. Namely, each read data may be constituted by a plurality of sectors. A sector may mean a data unit smaller than a page as a read unit of a flash memory. Sectors constituting each read data may be matched with one another by the medium of an address.

The error detection and correction circuit 126 may calculate a bit error rate (BER), and may determine whether an error is correctable or not, in the unit of sector. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. When a sector included in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable to the last. There may be one or more sectors that are determined to be uncorrectable. The error detection and correction circuit 126 may transfer information (for example, address information) on a sector which is determined to be uncorrectable, to the processor 124.

A bus 127 may be configured to provide channels among the components 121, 122, 124, 125 and 126 of the memory controller 120. The bus 127 may include, for example, a control bus for transferring various control signals, commands and the likes, and a data bus for transferring various data.

The above-described components 121, 122, 124, 125 and 126 of the memory controller 120 are exemplary. One or more of icy these components may be omitted, and/or two or more of such components may be integrated into one. Of course, the memory controller 120 may include one or more additional components.

The memory device 110 is described in further detail below with reference to FIG. 2.

Figure 2:
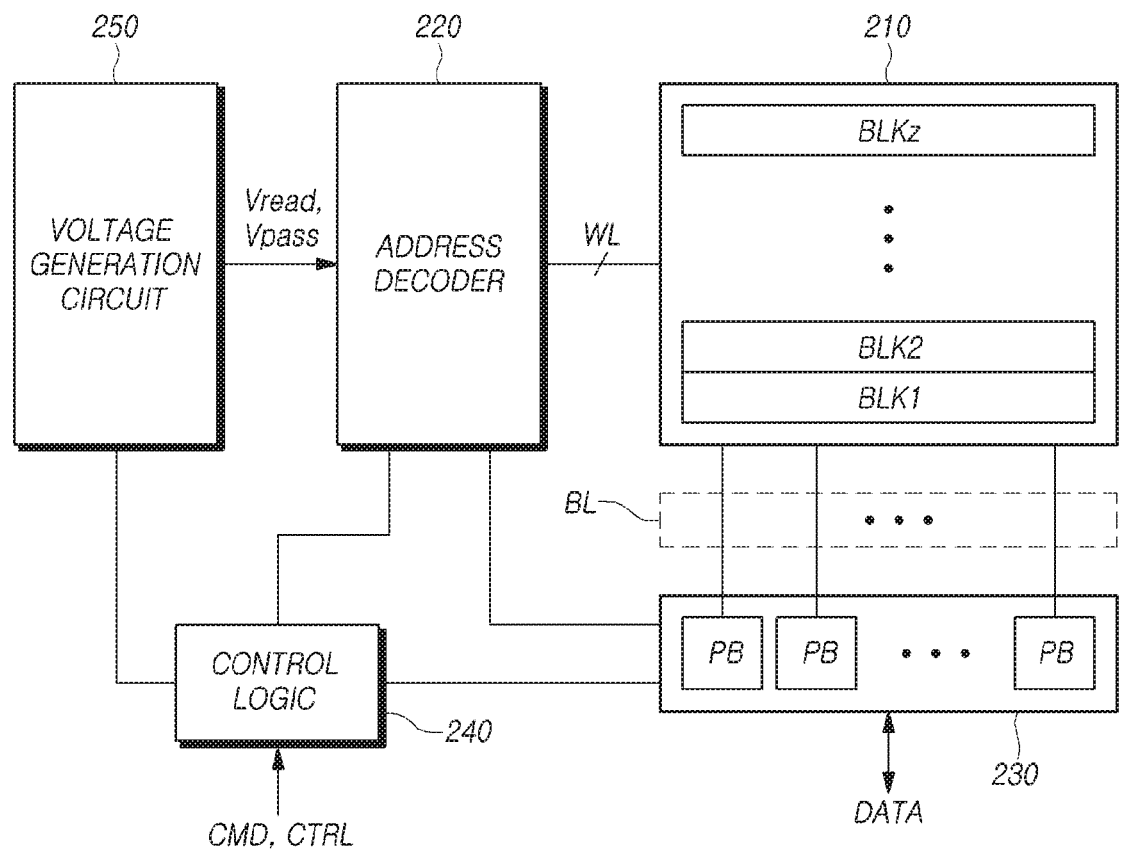
FIG. 2 is a block diagram schematically illustrating a memory device in accordance with an embodiment of the disclosure.

FIG. 2 is a block diagram schematically illustrating the memory device 110 in accordance with an embodiment of the disclosure.

Referring to FIG. 2, the memory device 110 may include a memory cell array 210, an address decoder 220, a read and write circuit 230, control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed in an intersecting pattern, and a plurality of memory cells (MC) may be arranged at the intersections.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, which have vertical channel structures.

The memory cell array 210 may be configured as a two-dimensional structure, or a three-dimensional structure.

Each of the plurality of memory cells included in the memory cell array 210 may store at least 1-bit data. For instance, each of the plurality of memory cells in the memory cell array 210 may be a single level cell (SLC) which stores 1-bit data, a multi-level cell (MLC) which stores 2-bit data, a triple level cell (TLC) which stores 3-bit data, or a quad level cell (QLC) which stores 4-bit data. In another embodiment, the memory cell array 210 may include a plurality of memory cells, each of which stores 5 or more-bit data.

Referring to FIG. 2, the address decoder 220, the read and write circuit 230, the control logic 240 and the voltage generation circuit 250 may operate as peripheral circuits which drive the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory device 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block in a read voltage applying operation during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory device 110 may be performed in the unit of page. An address received when a read operation or a program operation is requested may include at least one among a block address, a row address and a column address.

The address decoder 220 may select one memory block and one word line depending on a block address and a row address. A column address may be decoded by the address decoder 220 and be provided to the read and write circuit 230.

The address decoder 220 may include at least one among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit which includes a plurality of page buffers PB. The read and write circuit 230 may include data buffers which operate in a data processing function, and as the case may be, may further include cache buffers which perform a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, that the amounts of current flowing depending on the programmed states of the corresponding memory cells are changed.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Figure 3:
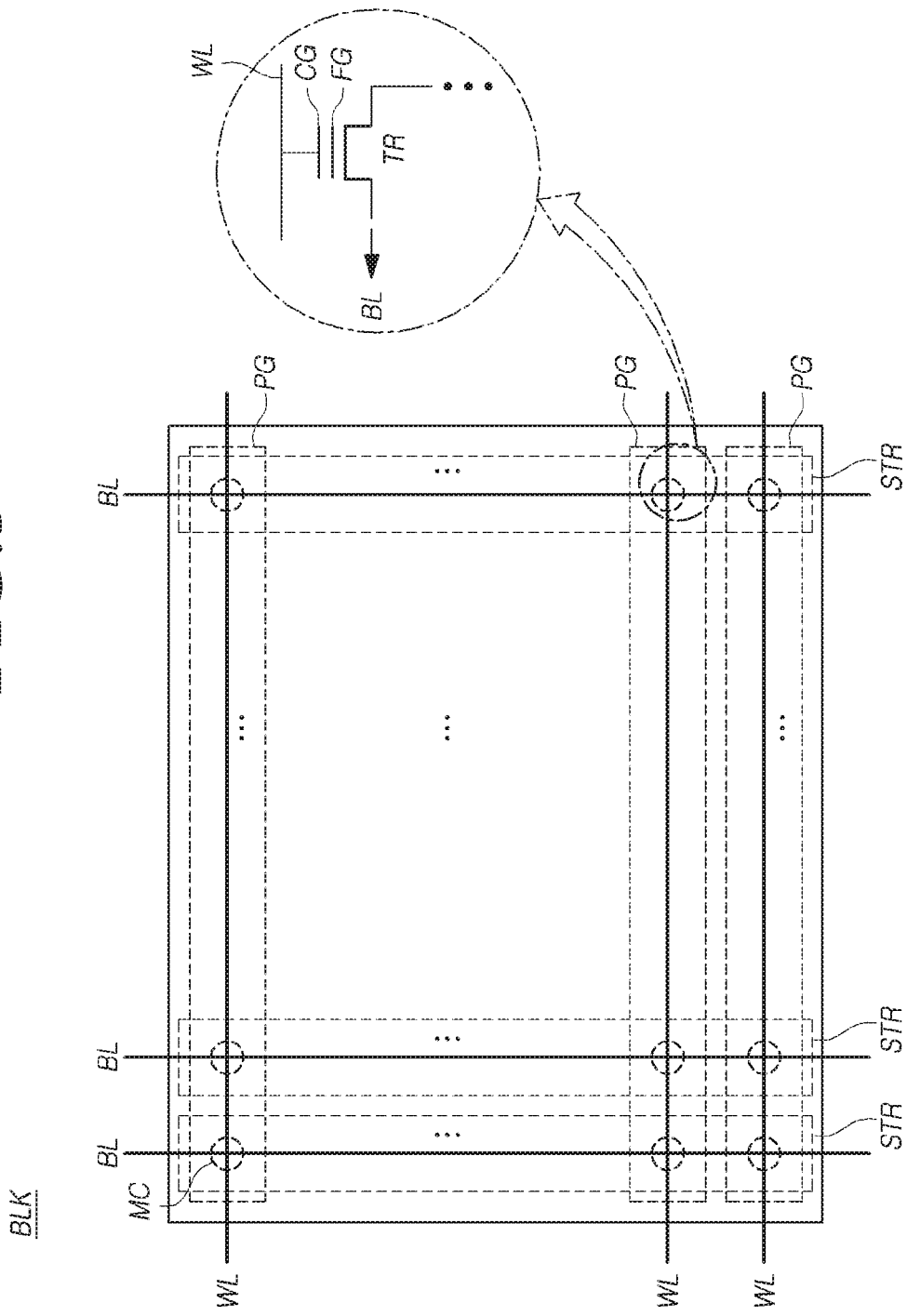
FIG. 3 is a diagram schematically illustrating a representative memory block of the memory device in accordance with an embodiment of the disclosure.

FIG. 3 is a diagram schematically illustrating a representative memory block BLK of the memory device 110 in accordance with an embodiment of the disclosure.

Referring to FIG. 3, the memory block BLK in the memory device 110 may be configured, for example, as a plurality of pages PG and a plurality of strings STR respectively disposed in different directions such that the pages and strings form an intersecting pattern.

The plurality of pages PG correspond to a plurality of word lines WL, and the plurality of strings STR correspond to a plurality of bit lines BL.

In the memory block BLK, the plurality of word lines WL and the plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

As the plurality of word lines WL and the plurality of bit lines BL intersect with each other, a plurality of memory cells MC may be defined at such intersections. A transistor TR may be disposed in each memory cell MC.

For example, the transistor TR disposed in each memory cell MC may include a drain, a source and a gate. The drain (or source) of the transistor TR may be coupled with a corresponding bit line BL directly or via another transistor TR. The source (or drain) of the transistor TR may be coupled with a source line (which may be the ground) directly or via another transistor TR. The gate of the transistor TR may include a floating gate FG which is surrounded by a dielectric and a control gate CG to which a gate voltage is applied from a word line WL.

In each of the plurality of memory blocks BLK1 to BLKz, a first select line (also referred to as a source select line or a drain select line) may be additionally disposed outside a first outermost word line more adjacent to the read and write circuit 230, and a second select line (also referred to as a drain select line or a source select line) may be additionally disposed outside a second outermost word line.

As the case may be, at least one dummy word line may be additionally disposed between the first outermost word line and the first select line. At least one dummy word line may also be additionally disposed between the second outermost word line and the second select line.

When the memory device 110 has a memory block structure illustrated in FIG. 3, a read operation and a program operation (write operation) may be performed in the unit of page, and an erase operation may be performed in the unit of memory block.

Figure 4:
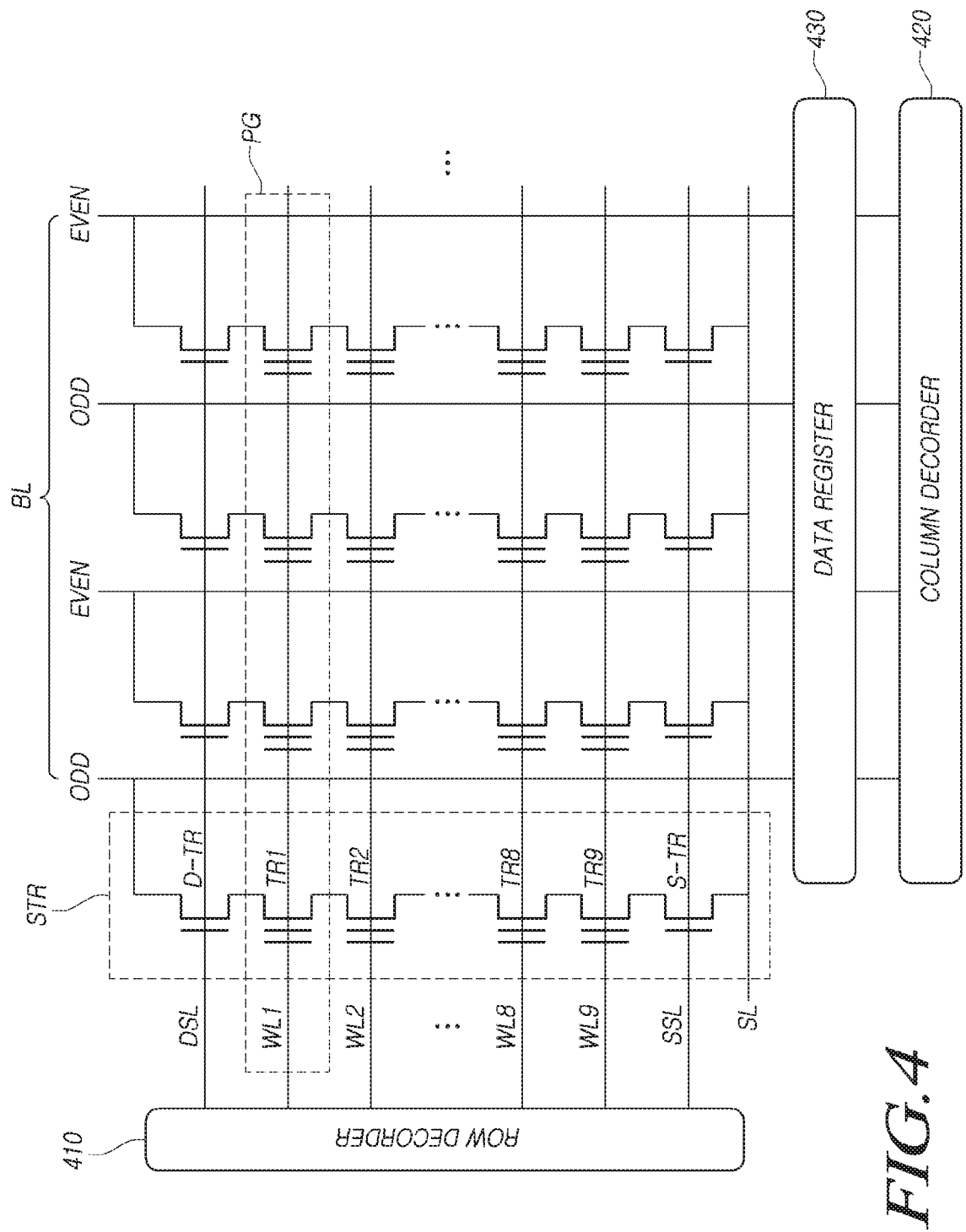
FIG. 4 is a diagram illustrating word lines and bit lines of the memory device in accordance with an embodiment of the disclosure.

FIG. 4 is a diagram illustrating a structure of word lines WL and bit lines BL of the memory device 110 in accordance with an embodiment of the disclosure.

Referring to FIG. 4, in the memory device 110, there exist a core area in which memory cells MC are gathered and an auxiliary area which corresponds to the remaining area excluding the core area and supports the operation of the memory cell array 210.

The core area may be configured by pages PG and strings STR. In such a core area, a plurality of word lines WL1 to WL9 and a plurality of bit lines BL are disposed to intersect with each other.

The plurality of word lines WL1 to WL9 may be coupled with a row decoder 410, and the plurality of bit lines BL may be coupled with a column decoder 420. A data register 430 corresponding to the read and write circuit 230 may be disposed between the plurality of bit lines BL and the column decoder 420.

The plurality of word lines WL1 to WL9 correspond to a plurality of pages PG.

For example, as illustrated in FIG. 4, each of the plurality of word lines WL1 to WL9 may correspond to one page PG. Alternatively, in the case in which the size of each of the plurality of word lines WL1 to WL9 is large, each of the plurality of word lines WL1 to WL9 may correspond to at least two (for example, two or four) pages PG. Page PG is a minimum unit in performing a program operation and a read operation. In the program operation and the read operation, all memory cells MC in the same page PG may simultaneously perform the corresponding operations.

The plurality of bit lines BL may be coupled with the column decoder 420 while being identified as odd-numbered bit lines BL and even-numbered bit lines BL.

In order to access memory cells MC, first, an address may be entered into the core area through the row decoder 410 and the column decoder 420 via an input/output terminal, and may designate target memory cells. Designating target memory cells means accessing memory cells MC positioned at sites where the word lines WL1 to WL9 coupled with the row decoder 410 and the bit lines BL coupled with the column decoder 420 intersect with each other, to program data to the memory cells MC or read out programmed data from the memory cells MC.

A page PG in a first direction (e.g., a horizontal direction as illustrated in FIG. 4) is bound (coupled) by a common line which is referred to as a word line WL, and a string STR in a second direction (e.g., a vertical direction as illustrated in FIG. 4) is bound (coupled) by a common line which is referred to as a bit line BL. Being bound in common means that corresponding memory cells MC are structurally coupled with one another by the same material and also the same voltage is simultaneously applied to the memory cells MC when a voltage is applied thereto. Of course, as a memory cell MC which is coupled in series and is positioned at an intermediate position or a last position is influenced by a voltage drop in a preceding memory cell MC, voltages applied to a first memory cell MC and a last memory cell MC may be slightly different from each other.

Since data is programmed and read via the data register 430 in all data processing operations of the memory device 110, the data register 430 plays a key role. If data processing of the data register 430 is delayed, all the other areas need to wait until the data register 430 completes the data processing. Also, if the performance of the data register 430 is degraded, the overall performance of the memory device 110 may be degraded.

Referring to the illustration of FIG. 4, in one string STR, a plurality of transistors TR1 to TR9 which are coupled with the plurality of word lines WL1 to WL9 may exist. Areas where the plurality of transistors TR1 to TR9 exist correspond to memory cells MC. Each of the plurality of transistors TR1 to TR9 includes a control gate CG and a floating gate FG as described above.

The plurality of word lines WL1 to WL9 include two outermost word lines WL1 and WL9. A first select line DSL may be additionally disposed outside a first outermost word line WL1 which is more adjacent to the data register 430 in terms of signal path, and a second select line SSL may be additionally disposed outside a second outermost word line WL9.

A first select transistor D-TR which is on-off controlled by the first select line DSL has only a gate electrode coupled with the icy first select line DSL and does not include a floating gate FG. A second select transistor S-TR which is on-off controlled by the second select line SSL has only a gate electrode coupled with the second select line SSL and does not include a floating gate FG.

The first select transistor D-TR serves as a switch which turns on or off the coupling between a corresponding string STR and the data register 430. The second select transistor S-TR serves as a switch which turns on or off the coupling between the corresponding string STR and a source line SL. That is to say, the first select transistor D-TR and the second select transistor S-TR are respectively positioned at opposite ends of the corresponding string STR, and serve as gate-keepers which couple and decouple signals.

In a program operation, because it is necessary to fill electrons in a target memory cell MC of a bit line BL which is to be programmed, the memory system 100 turns on the first select transistor D-TR by applying a set turn-on voltage Vcc to the gate electrode of the first select transistor D-TR, and turns off the second select transistor S-TR by applying a set turn-off voltage (e.g., 0V) to the gate electrode of the second select transistor S-TR.

In a read operation or a verify operation, the memory system 100 turns on both the first select transistor D-TR and the second select transistor S-TR. Accordingly, since current may be discharged to the source line SL corresponding to the ground through the corresponding string STR, a voltage level of the bit line BL may be measured. However, in the read operation, there may be a time difference between on-off timings of the first select transistor D-TR and the second select transistor S-TR.

In an erase operation, the memory system 100 may supply a set voltage (e.g., +20V) to a substrate through the source line SL. In the erase operation, the memory system 100 floats both the first select transistor D-TR and the second select transistor S-TR, thereby providing infinite resistance. Accordingly, the memory system 100 is structured such that the first select transistor D-TR and the second select transistor S-TR do not function and electrons may operate due to a potential difference only between a floating gate FG and the substrate.

Figure 5:
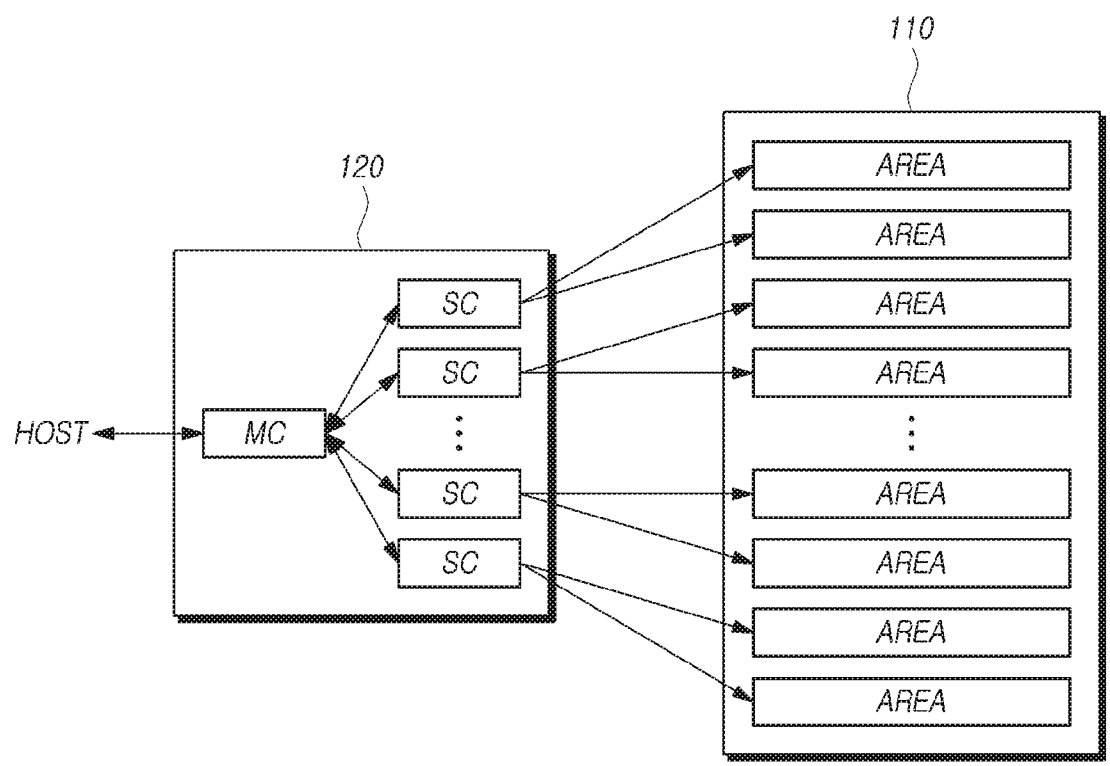
FIG. 5 is a diagram illustrating a structure of a main core and sub-cores in the memory system in accordance with an icy embodiment of the disclosure.

FIG. 5 is a diagram illustrating a structure of a main core MC and sub-cores SC in the memory system 100 in accordance with an embodiment of the disclosure.

Referring to FIG. 5, the memory controller 120 of the memory system 100 may include one main core MC and a plurality of sub-cores SC.

The main core MC may receive a command from the host, and may transmit a result of processing the command to the host. The main core MC may communicate with the plurality of sub-cores SC, and may control respective operations of the plurality of sub-cores SC.

The main core MC may receive a target command from the host. The target command instructs an operation of writing target data to the memory device 110.

The memory device 110 may include a plurality of memory areas, each denoted by AREA in FIG. 5. Each memory area may be determined in various ways.

For example, the memory device 110 may include a plurality of memory dies, and each memory die may correspond to one memory area.

In this case, each of the plurality of memory dies may include a plurality of memory blocks. Each of the plurality of memory blocks may include a plurality of pages.

As another example, each memory area may represent one or more of a plurality of memory blocks in the memory device 110.

Each of the plurality of sub-cores SC may communicate with the main core MC, and may control data write (store) operations for one or more of the plurality of memory areas in the memory device 110.

The fact that data is written to a memory area means that data is written to a memory die or a memory block in the corresponding memory area.

Each sub-core SC may exclusively control one or more memory areas. That is, each of the plurality of memory areas in the memory device 110 is controlled only by one sub-core SC among the icy plurality of sub-cores SC. That is to say, two or more sub-cores SC do not jointly control one memory area.

Each of the plurality of sub-cores SC may independently control write operations for different memory areas. Each of the plurality of sub-cores SC is not influenced by other sub-cores SC when controlling a data write operation for a memory area controlled by itself.

Each of the plurality of sub-cores SC may communicate with the main core MC, but the sub-cores SC do not communicate with one another.

The main core MC and the plurality of sub-cores SC may be realized by a plurality of processor cores which are included in the processor 124 in the memory controller 120.

Figure 6:
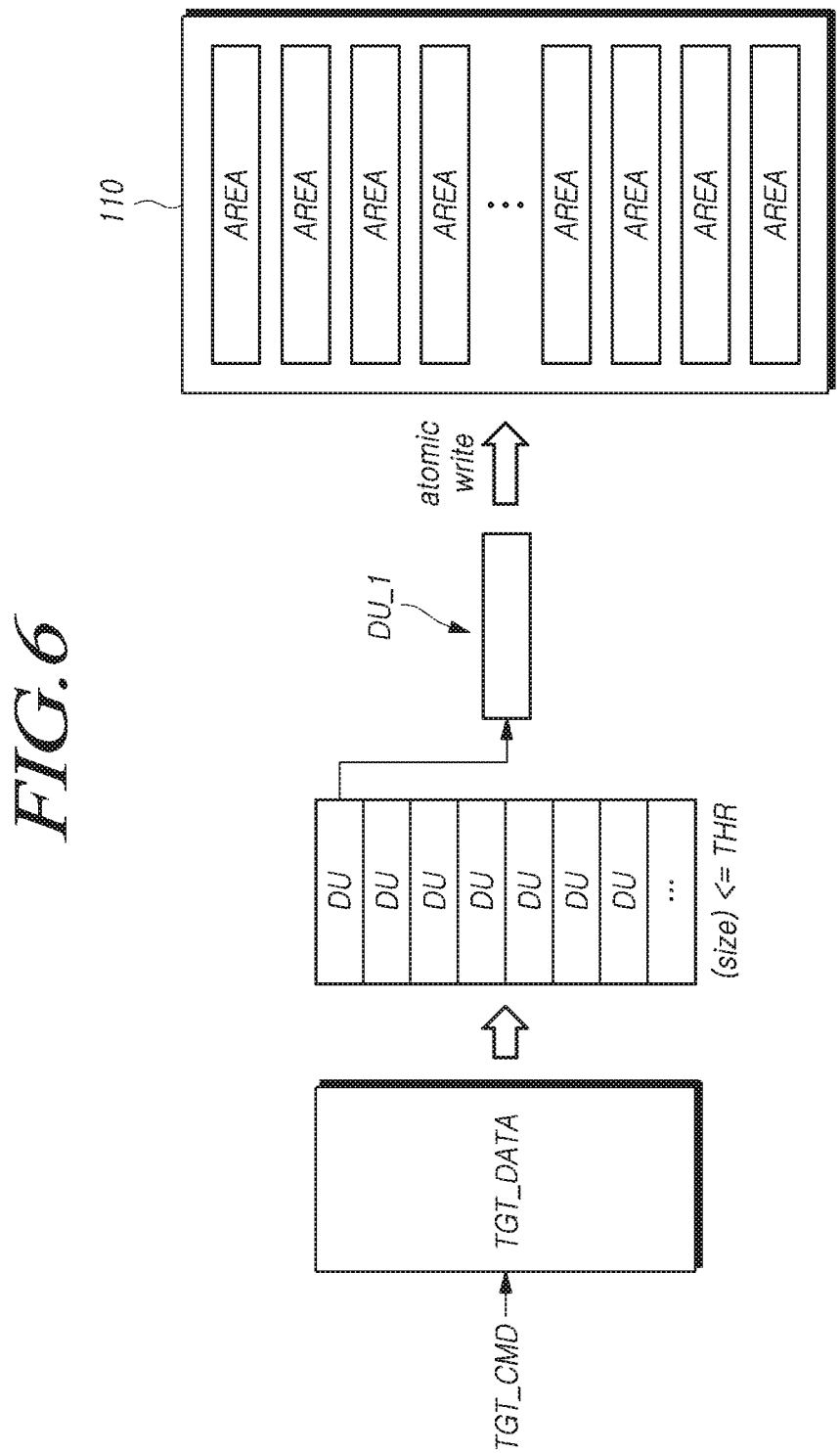
FIG. 6 is a diagram illustrating an operation of writing a data unit in the memory system in accordance with an embodiment of the disclosure.

FIG. 6 is a diagram illustrating an operation of writing a data unit DU in the memory system 100 in accordance with an embodiment of the disclosure.

Referring to FIG. 6, when receiving, from the host, a target command TGT_CMD which instructs an operation of writing target data TGT_DATA to the memory device 110, first, the main core MC in the memory controller 120 of the memory system 100 may divide the target data TGT_DATA into data units DU each having a size equal to or less than a threshold size THR, and may allocate the data units DU to the plurality of sub-cores SC.

For example, if the target data TGT_DATA is 100 KB and the threshold size THR is 30 KB, the main core MC of the memory controller 120 may divide the target data TGT_DATA into three data units each having a size of 30 KB and one data unit having a size of 10 KB.

If a size of the target data TGT_DATA is equal to or less than the threshold size THR, the main core MC of the memory controller 120 may process the target data TGT_DATA as a single data unit.

The memory controller 120 may control the plurality of sub-cores SC to write a first data unit DU_1 of the data units DU to the memory device 110 while maintaining the atomicity of the first data unit DU_1.

The first data unit DU_1 may retain its atomicity when the memory controller 120 controls the plurality of sub-cores SC to write all, not part, of the first data unit DU_1 to or from the memory device 110.

For instance, assume that an SPO (sudden power-off) occurs while the first data unit DU_1 is being written to the memory device 110. In this case, part of, i.e., a piece of, the first data unit DU_1 may be transiently stored in the memory device 110 at the time of the SPO. In order to retain the atomicity of the first data unit DU_1, the memory controller 120 may roll back the stored piece of the first data unit DU_1 from the memory device 110 in a recovery operation for the SPO to avoid having only a part of the first data unit DU_1 written to the memory device 110.

In order to roll back the stored piece of the first data unit DU_1 from the memory device 110, the memory controller 120 may restore map information between a logical address and a physical address for the stored piece of the first data unit DU_1, to a state before that piece of the first data unit DU_1 was written to the memory device 110.

As another example of maintaining the atomicity of the first data unit DU_1, the memory controller 120 may write, during the recovery operation for the SPO, the remaining part of the first data unit DU_1, which has not been written to the memory device 110, to the memory device 110, so that all of first data unit DU_1 is written to the memory device 110.

Hereinafter, a detailed method in which the memory controller 120 writes the first data unit DU_1 to the memory device 110 while maintaining atomicity of the first data unit DU_1 is described.

Figure 7:
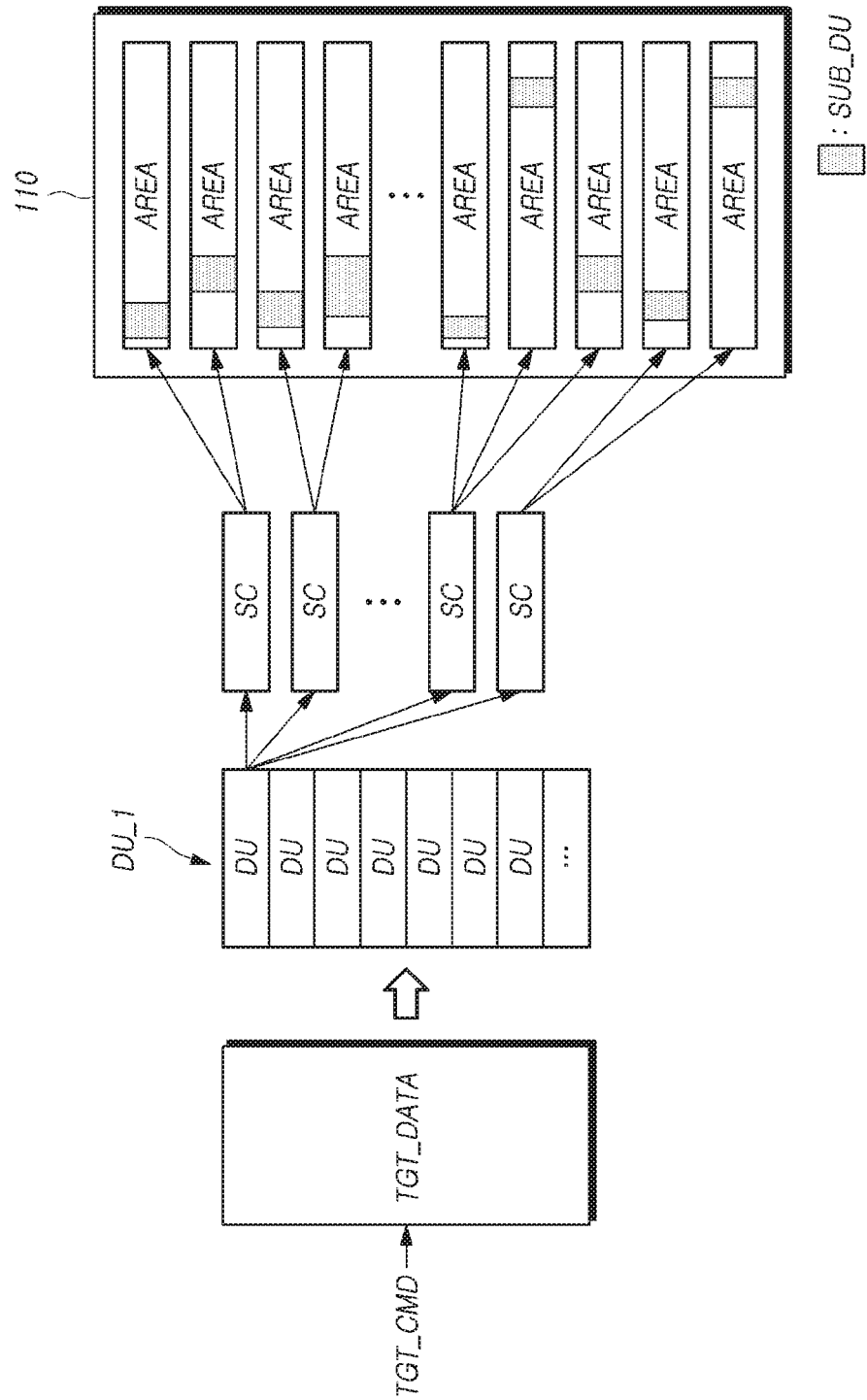
FIG. 7 is a diagram illustrating an operation in which a data unit is further divided into sub-data units that are distributed and written to the memory device in accordance with an embodiment of the disclosure.

FIG. 7 is a diagram illustrating an operation in which a data unit is further divided into sub-data units SUB_DU that are distributed and written to the memory device 110 in accordance with an embodiment of the disclosure.

Referring to FIG. 7, as described above, when the main core MC receives, from the host, a target command TGT_CMD which instructs an operation of writing target data TGT_DATA to the memory device 110, first, the memory controller 120 of the memory system 100 may divide the target data TGT_DATA into a plurality of data units DU each having a size equal to or less than a threshold size THR.

The memory controller 120 may write a first data unit DU_1, which is one of the plurality of data units DU, to the plurality of memory areas (each denoted by AREA in FIG. 7) in the memory device 110, by distributing the first data unit DU_1 to a plurality of sub-data units SUB_DU. The main core MC may divide the first data unit DU_1 into a plurality of sub-data units SUB_DU and distribute the sub-data units SUB_DU.

Each of the sub-data units SUB_DU may include part of the first data unit DU_1, and sizes of the respective sub-data units SUB_DU may be different from one another. The respective sub-data units SUB_DU may be written to different memory areas AREA.

Each of the plurality of sub-cores SC in the memory controller 120 may be controlled to write some of the plurality of sub-data units SUB_DU to memory areas controlled by the corresponding sub-core.

Figure 8:
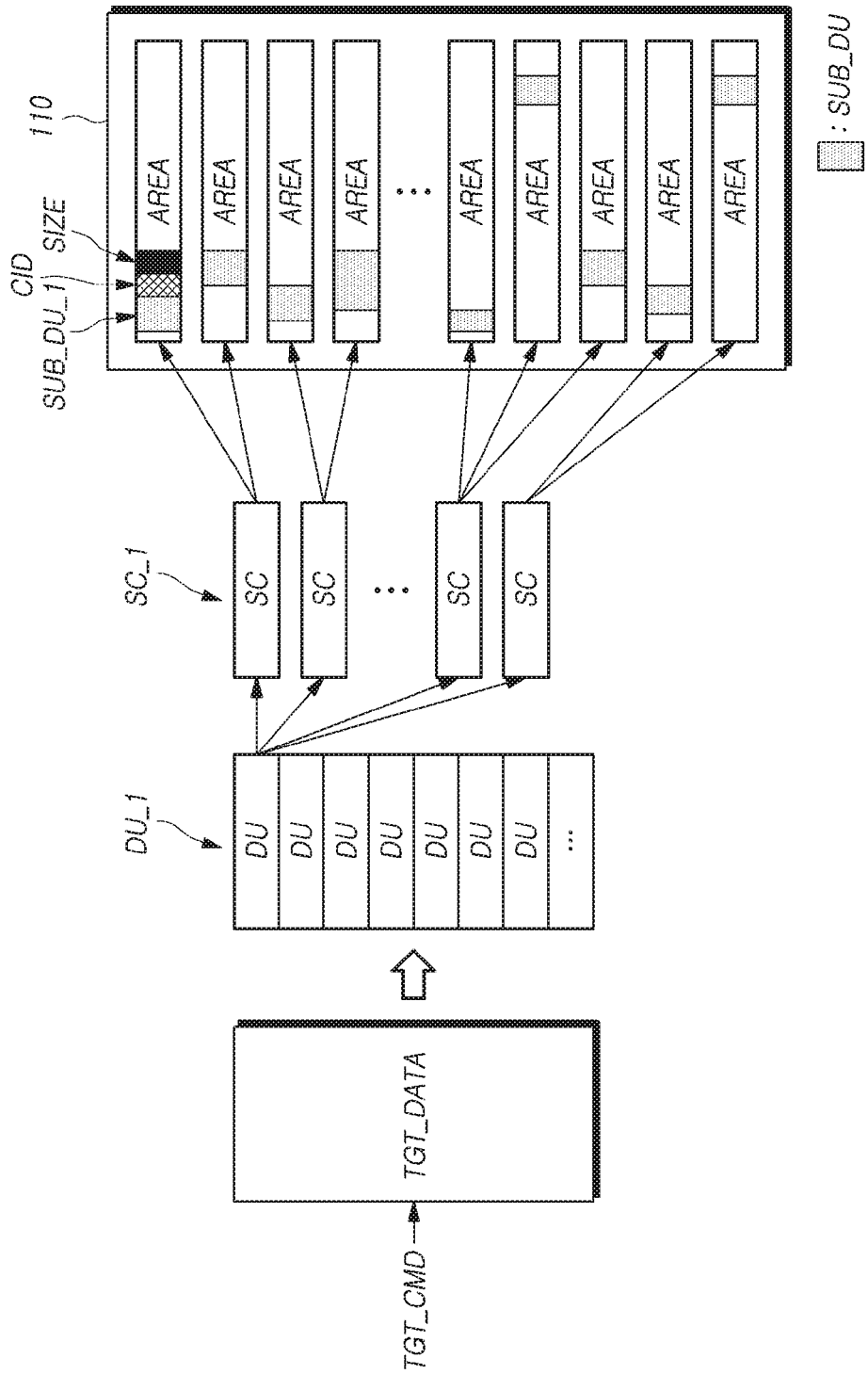
FIG. 8 is a diagram illustrating an operation of writing sub-data units to the memory device in the memory system in accordance with an embodiment of the disclosure.

FIG. 8 is a diagram illustrating an operation of writing sub-data units SUB_DU to the memory device 110 in the memory system 100 in accordance with an embodiment of the disclosure.

As described above with reference to FIG. 7, the memory controller 120 of the memory system 100 may divide the first data unit DU_1 into the plurality of sub-data units SUB_DU.

A first sub-core SC_1 among the plurality of sub-cores SC in the memory controller 120, may write a first sub-data unit SUB_DU_1, among the plurality of sub-data units SUB_DU, to a target memory area, which may be one of memory areas controlled by the first sub-core SC_1.

The first sub-core SC_1 may write, together with the first sub-data unit SUB_DU_1, identification CID of the target command TGT_CMD and a size value SIZE of the first sub-data unit SUB_DU_1, where CID stands for command identification.

The CID of the target command TGT_CMD may be generated by the main core MC. For example, the main core MC may generate the CID of the target command TGT_CMD by using a separate count value that increases as time goes by or by using a random numerical value generated by using a factor such as a current time, as a seed.

The reason why, in this way, the first sub-core SC_1 writes the CID of the target command TGT_CMD and the size value SIZE of the first sub-data unit SUB_DU_1 together with the first sub-data unit SUB_DU_1 is to allow the memory controller 120 to control the first data unit DU_1 to be written to the memory device 110 while maintaining atomicity of the first data unit DU_1.

In a recovery operation after the occurrence of an SPO, in order to keep the atomicity of the first data unit DU_1, the memory controller 120 rolls back a piece of the first data unit DU_1 written to the memory device 110 at the time of the SPO, so that this piece of the first data unit DU_1 returns to a state before written.

To this end, the memory controller 120 may search for data pieces stored in the memory device 110 at the time of the SPO for a sub-data unit SUB_DU of the first data unit DU_1.

The memory controller 120 may detect, based on the CID of the target command TGT_CMD, which is also written at the time of the SPO, the sub-data unit SUB_DU of the first data unit DU_1 among the data pieces stored in the memory device 110 at the time of the SPO.

The memory controller 120 may identify, based on the size value SIZE, which is also written at the time of the SPO, the size of the detected sub-data unit SUB_DU.

Figure 9:
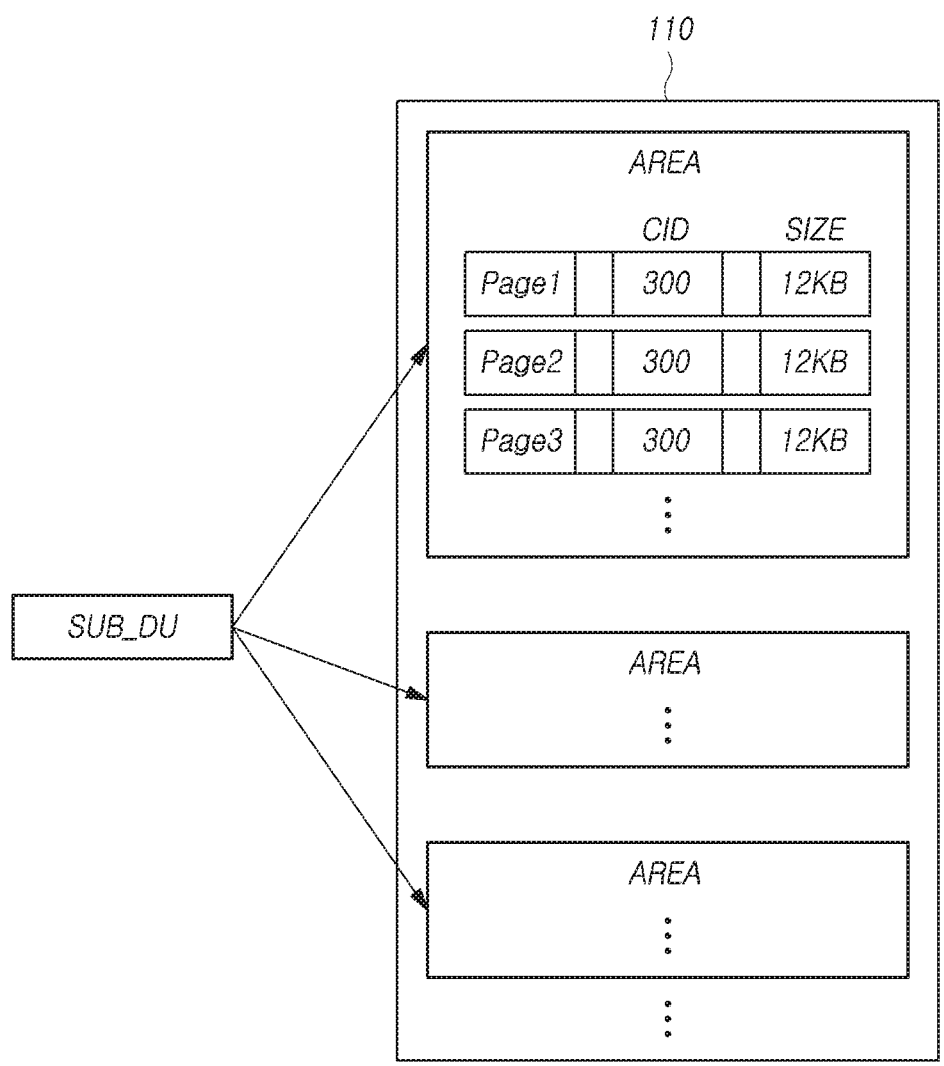
FIG. 9 is a diagram illustrating an operation of writing a sub-data unit to memory areas in the memory device in the memory system in accordance with an embodiment of the disclosure.

FIG. 9 is a diagram illustrating an operation of writing a sub-data unit SUB_DU to memory areas in the memory device 110 in the memory system 100 in accordance with an embodiment of the disclosure.

Referring to FIG. 9, the sub-data unit SUB_DU may be distributed and written to pages in one or more memory areas in the memory device 110. Each of the pages in which the distributed sub-data unit SUB_DU is stored may be included in a memory block in any one of the memory area(s).

A CID of a target command corresponding to the sub-data unit SUB_DU and a size value SIZE of the sub-data unit SUB_DU may be written to each of the plurality of pages in which the distributed sub-data unit SUB_DU is stored.

For example, it is assumed that the CID of the target command corresponding to the sub-data unit SUB_DU is 300 and the size value SIZE of the sub-data unit SUB_DU is 12 KB. Further, it is assumed that the distributed sub-data unit SUB_DU is stored to three pages, i.e., Page1, Page2 and Page3.

In this case, 300 as the CID of the target command corresponding to the sub-data unit SUB_DU and 12 KB as the size value SIZE of the sub-data unit SUB_DU may be written to each of Page1, Page2 and Page3.

Figure 10:
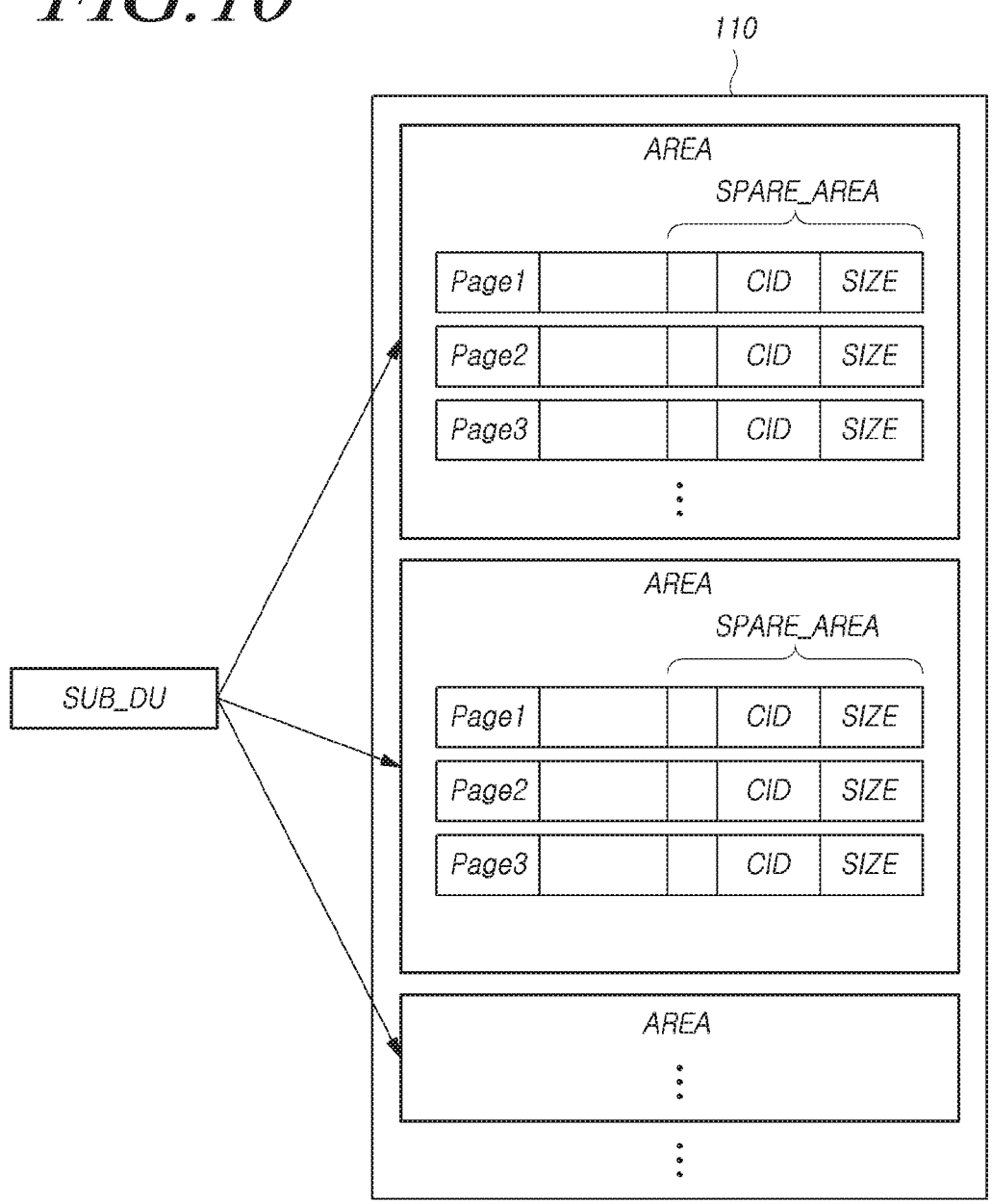
FIG. 10 is a diagram illustrating an operation of writing a sub-data unit to memory areas in the memory device in the memory system in accordance with an embodiment of the disclosure.

FIG. 10 is a diagram illustrating an operation of writing a sub-data unit SUB_DU to memory areas in the memory device 110 in the memory system 100 in accordance with an embodiment of the disclosure.

Referring to FIG. 10, as in FIG. 9, the sub-data unit SUB_DU may be distributed and written to pages included in one or more memory areas in the memory device 110. A CID of a target command corresponding to the sub-data unit SUB_DU and a size value SIZE of the sub-data unit SUB_DU may be written to each of the pages in which the distributed sub-data unit SUB_DU is stored.

The CID of the target command corresponding to the sub-data unit SUB_DU and the size value SIZE of the sub-data unit SUB_DU may be written to a spare area SPARE_AREA.

The spare area is an area where meta information for a page (e.g., a logical address corresponding to a physical address of the page) is stored. The spare area may be a specific page included in a memory block, or may be positioned in each of the plurality of pages in which the distributed sub-data unit SUB_DU is stored, as illustrated in FIG. 10.

Above, an operation of writing target data to the memory device 110 in the memory system 100 is described.

Below, an operation of the memory system 100 to write a data unit for target data to the memory device 110 in order to maintain atomicity of the data unit in a recovery operation after the occurrence of an SPO is described.

Figure 11:
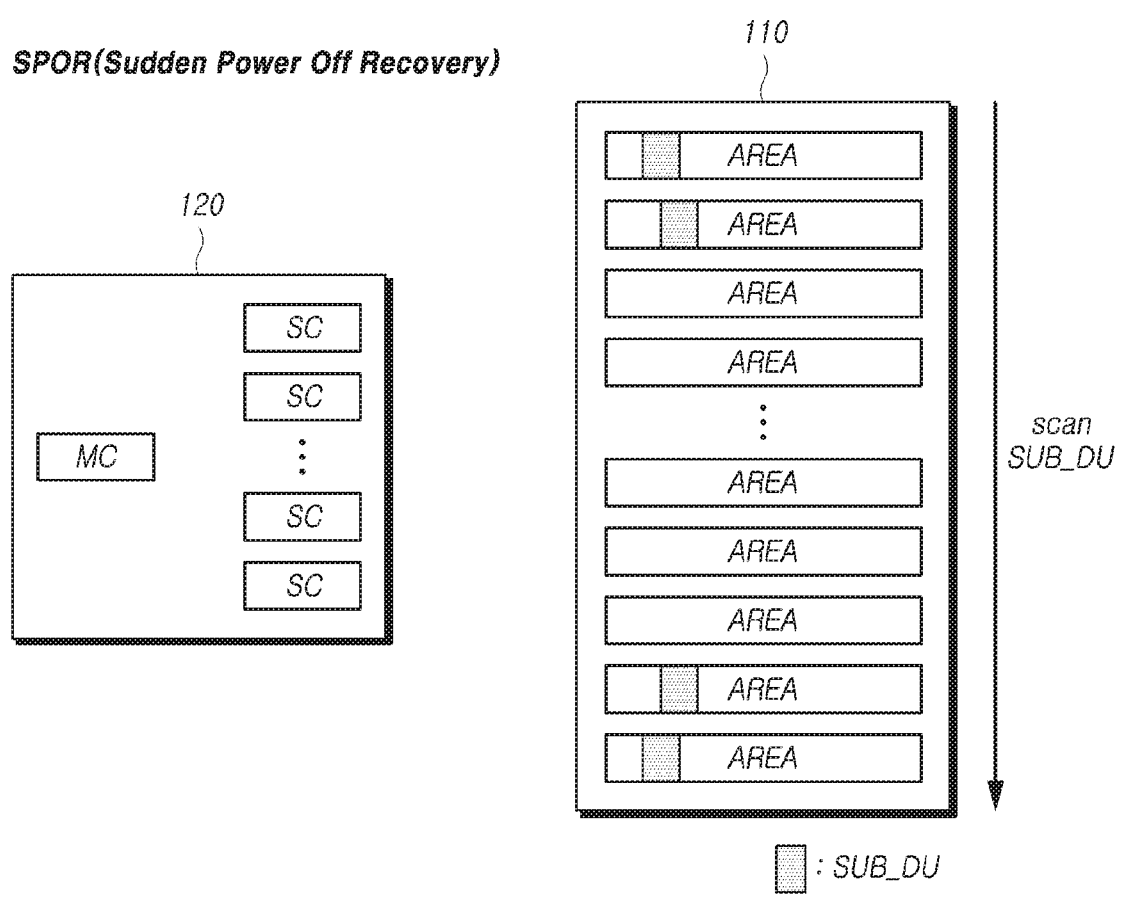
FIG. 11 is a diagram illustrating a sudden power-off recovery (SPOR) operation in the memory system in accordance with an embodiment of the disclosure.

FIG. 11 is a diagram illustrating an SPOR (sudden power-off recovery) operation in the memory system 100 in accordance with an embodiment of the disclosure.

If an SPO (sudden power-off) occurs while the memory controller 120 of the memory system 100 writes data to the memory device 110, the memory controller 120 may perform an SPOR (sudden power-off recovery) operation upon rebooting after the SPO, to restore the memory device 110.

In the SPOR operation, the memory controller 120 should update map information for data being written to the memory device 110 when the SPO occurs. Updating map information for data means that the map information for the corresponding data is written to the memory device 110 and is cached in a map cache in the memory controller 120.

This is because, if the SPO occurs, the map information for the data being written to the memory device 110 may be lost without being written to the memory device 110.

Therefore, by scanning the memory device 110, the memory controller 120 updates map information for a sub-data unit SUB_DU that was being written to the memory device 110 at the time of the SPO, among sub-data units SUB_DU of the first data unit DU_1.

When updating the map information, the memory controller 120 may write a logical address corresponding to the physical address of a page to the spare area described above with reference to FIG. 10.

However, when an uncorrectable ECC (UECC) occurs in part, i.e., a piece, of the sub-data unit SUB_DU written to a plurality of memory areas due to the SPO, map information for the sub-data unit SUB_DU should not be updated. This is because the UECC in that piece of the sub-data unit SUB_DU means that writing of the sub-data unit SUB_DU has failed as a result of the SPO.

In this case, in order to keep the atomicity of the first data unit, the memory controller 120 should unmap all the sub-data units SUB_DU for the first data unit DU_1. Unmapping data means that map information of the data is rolled back to a state before the data is written. Thus, if data is unmapped, the data is no longer read.

That is to say, the memory controller 120 should roll back, during the SPOR operation, map information for all the sub-data units SUB_DU for the first data unit DU_1 so that the entire first data unit returns to a state in which none of it is written to the memory device 110.

A detailed operation in which the memory controller 120 unmaps all sub-data units for a first data unit is described with reference to FIGS. 12 to 14.

Figure 12:
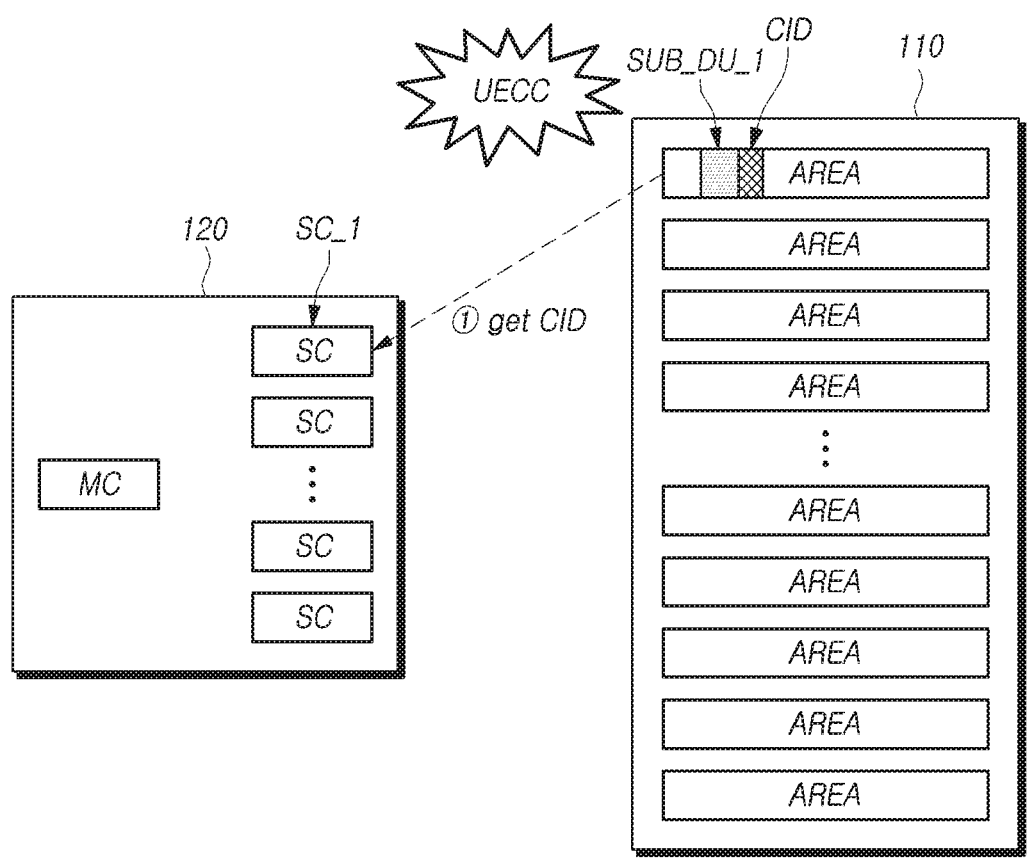
FIGS. 12 to 14 are diagrams illustrating an operation when an uncorrectable error correction code (UECC) is detected during a SPOR operation in the memory system in accordance with an embodiment of the disclosure.
Figure 13:
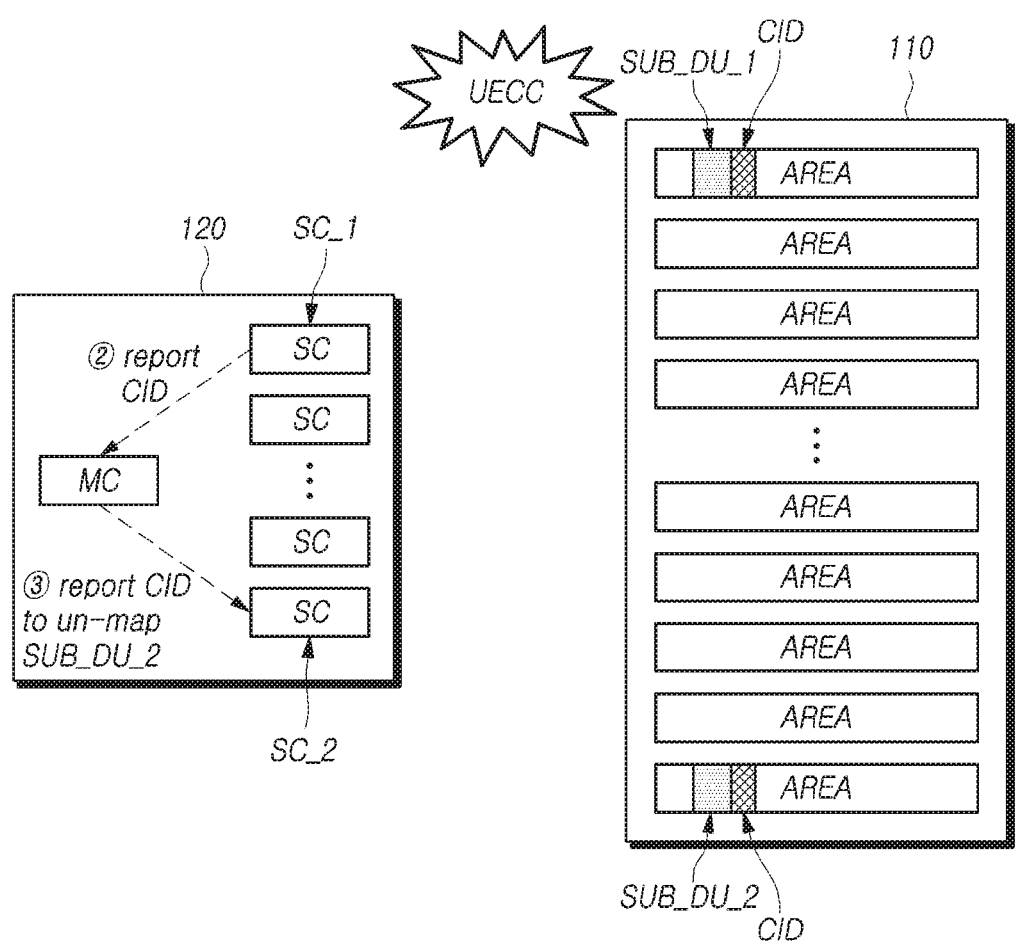
Figure 14:
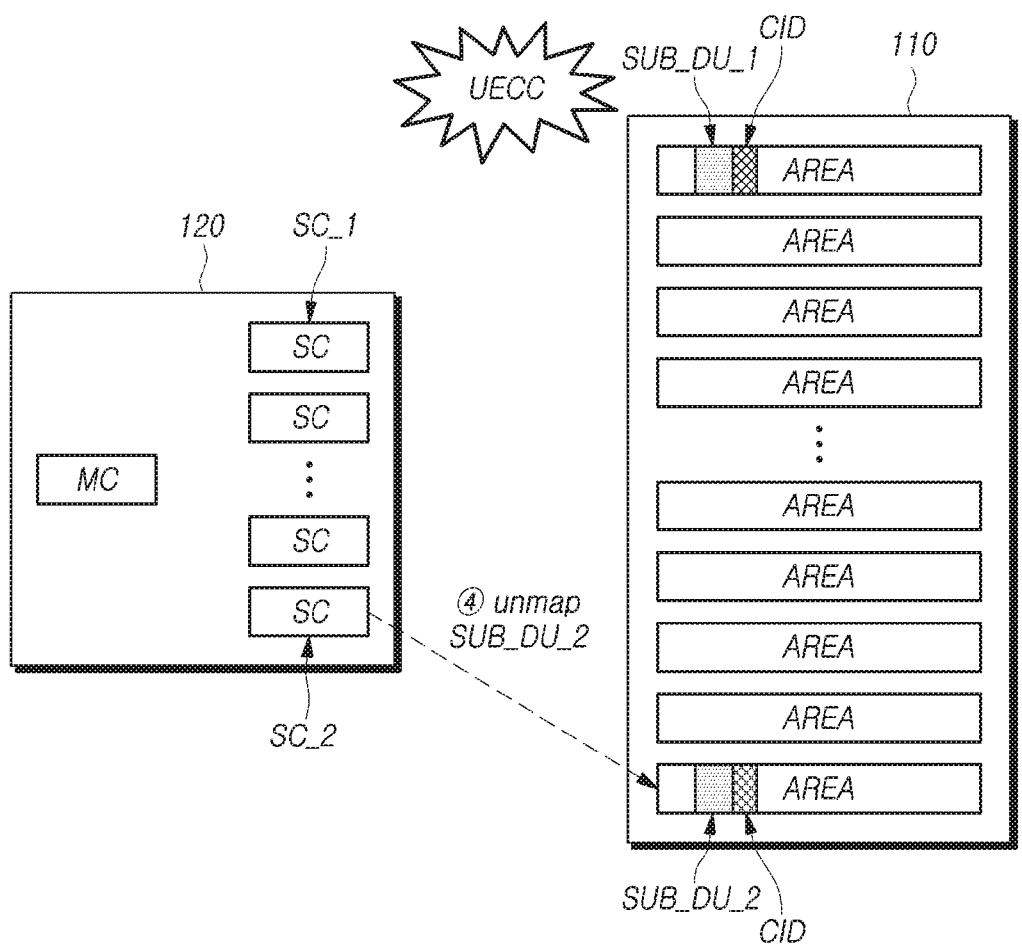

FIGS. 12 to 14 are diagrams illustrating an operation when a UECC is detected during the SPOR operation in the memory system 100 in accordance with an embodiment of the disclosure.

First, it is assumed that a UECC is detected in a first sub-data unit SUB_DU_1, among sub-data units for a first data unit, written to the memory device 110. Further, it is assumed that the first sub-data unit SUB_DU_1 is written by a first sub-core SC_1 among the plurality of sub-cores SC.

In FIG. 12, when the UECC is detected in the first sub-data unit SUB_DU_1, the first sub-core SC_1 may read a CID of a target command, which is stored together with the first sub-data unit SUB_DU_1, from a target memory area where the first sub-data unit SUB_DU_1 is stored.

In FIG. 13, the first sub-core SC_1 may report the CID of the target command read from the target memory area to the main core MC.

The main core MC instructs, based on the reported CID of the target command, a second sub-core SC_2 to unmap a second sub-data unit SUB_DU_2, which is written to a memory area controlled by the second sub-core SC_2, the first sub-data unit SUB_DU_1 and the second sub-data unit SUB_DU_2 belonging to the first data unit DU_1.

To this end, the main core MC may provide the second sub-core SC_2 with the reported CID. The second sub-core SC_2 may detect, based on the reported CID, a sub-data unit SUB_DU (e.g., the second sub-data unit SUB_DU_2) belonging to the first data unit DU_1 among data stored in the memory area controlled by the second sub-core SC_2.

The reason why, in this way, the first sub-core SC_1 reports the CID of the target command via the main core MC, instead of directly reporting the CID of the target command to the second sub-core SC_2, is because the respective sub-cores SC independently operate without communicating with one another as described above.

In FIG. 14, the second sub-core SC_2 unmaps the detected second sub-data unit SUB_DU_2 written to the memory area controlled by the second sub-core SC_2.

The content described above with reference to FIGS. 11 to 14 is described below using a flow chart with reference to FIG. 15.

Figure 15:
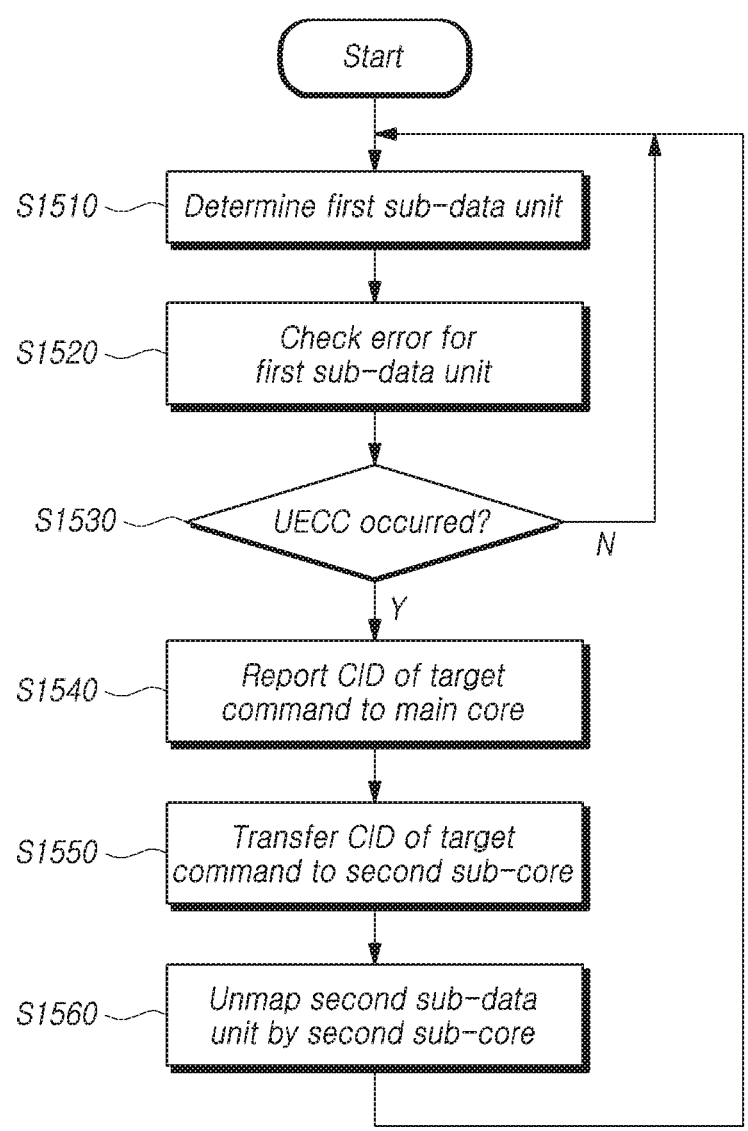
FIG. 15 is a flow chart to assist in the explanation of a SPOR operation in the memory system in accordance with an embodiment of the disclosure.

FIG. 15 is a flow chart to assist in the explanation of the SPOR operation in the memory system 100 in accordance with an embodiment of the disclosure.

By way of example, the SPOR operation is executed by the memory controller 120 of the memory system 100.

First, the memory controller 120 detects the first sub-data unit of the first data unit while scanning the memory areas in the memory device 110 (S1510).

The memory controller 120 performs an error check for the first sub-data unit detected at the step S1510 (S1520), and thereby, determines whether a UECC has occurred in the first sub-data unit (S1530).

When a UECC has occurred in the first sub-data unit (S1530—Y), the first sub-core, among the plurality of sub-cores in the memory controller 120, reports the CID of the target command to the main core (S1540).

The main core in the memory controller 120 transfers the reported CID to a different sub-core than the first sub-core, i.e., the second sub-core (S1550).

The second sub-core in the memory controller 120 detects, based on the reported CID, a second sub-data unit of the first data unit and unmaps the detected second sub-data unit (S1560). Then, the process proceeds to the step S1510. The second sub-data may be stored in the memory area controlled by the second sub-core.

On the other hand, when a UECC has not occurred in the icy first sub-data unit (S1530—N), the process returns to the step S1510.

Figure 16:
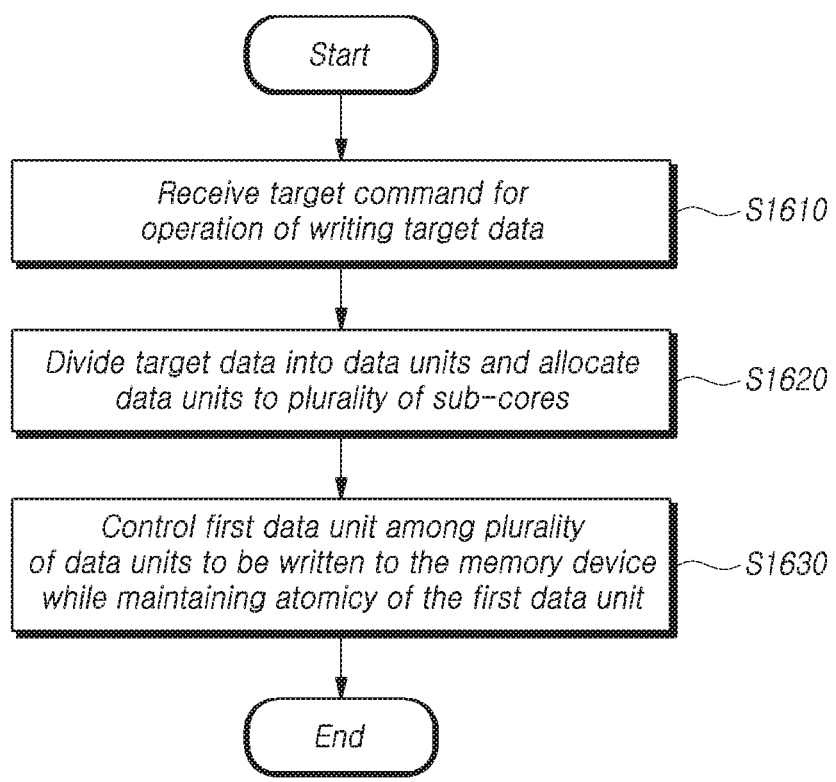
FIG. 16 is a flow chart to assist in the explanation of a method for operating a memory controller in accordance with an embodiment of the disclosure.

FIG. 16 is a flow chart to assist in the explanation of a method for operating the memory controller 120 in accordance with an embodiment of the disclosure.

The memory controller 120 includes one main core and a plurality of sub-cores which communicate with the main core and control data write operations for one or more memory areas among a plurality of memory areas in the memory device 110.

First, the operating method of the memory controller 120 may include receiving, by the main core, a target command for an operation of writing target data to the memory device 110, from the host (S1610).

Further, the operating method of the memory controller 120 may include dividing the target data into data units each having a size equal to or less than a threshold size and allocating the data units to the plurality of sub-cores, by the main core (S1620).

Lastly, the operating method of the memory controller 120 may include controlling the plurality of sub-cores in the memory controller 120 to write a first data unit among a plurality of data units to the memory device 110 while maintaining atomicity of the first data unit (S1630).

The above-described operation of the memory controller 120 may be controlled by the control circuit 123, and may be performed in such a manner that the processor 124 executes (drives) icy firmware in which general operations of the memory controller 120 are programmed.

Figure 17:
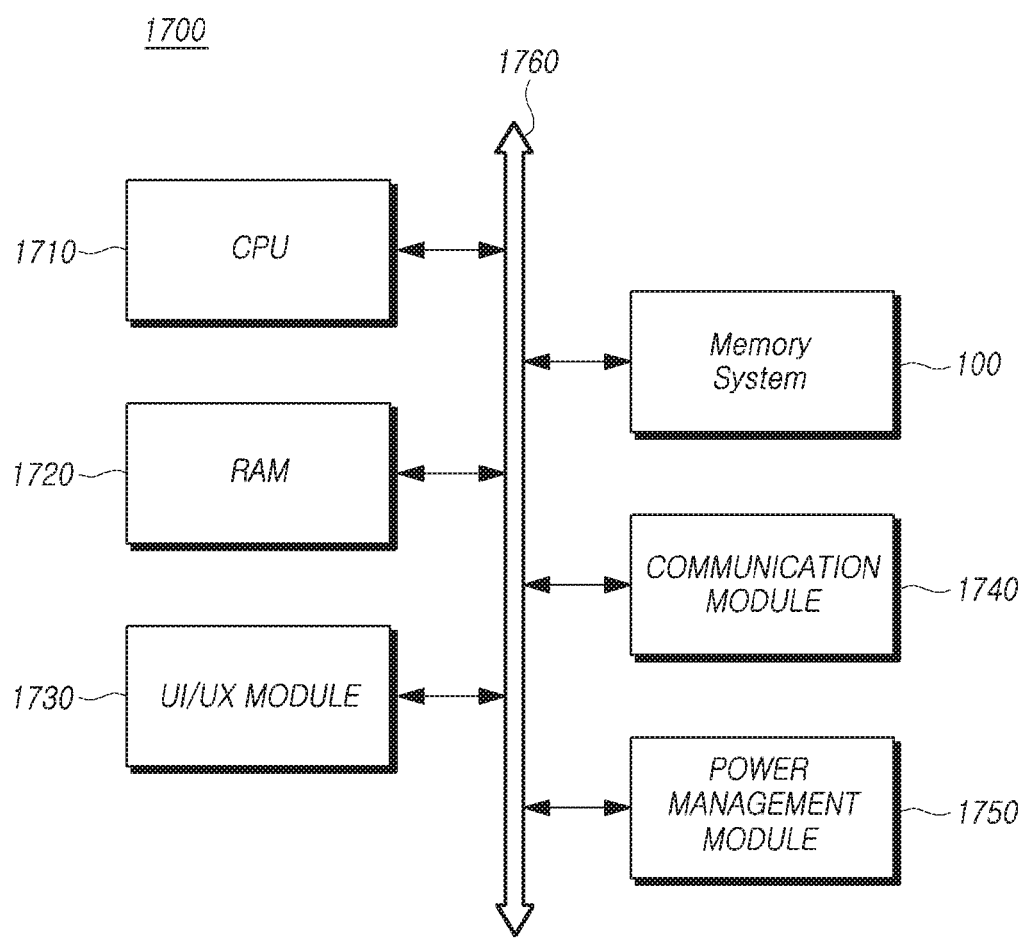
FIG. 17 is a schematic diagram illustrating a configuration of a computing system in accordance with an embodiment of the disclosure.

FIG. 17 is a diagram illustrating a configuration of a computing system 1700 in accordance with an embodiment of the disclosure.

Referring to FIG. 17, the computing system 1700 may include a memory system 100, a central processing unit (CPU) 1710 for controlling general operations of the computing system 1700, a RAM 1720 for storing data and information related with operations of the computing system 1700, a UI/UX (user interface/user experience) module 1730 for providing a user environment, a communication module 1740 for communicating with an external device in a wired and/or wireless manner and a power management module 1750 for managing power used by the computing system 1700, which are electrically coupled to a system bus 1760.

The computing system 1700 may include a PC (personal computer), a mobile terminal such as a smartphone or a tablet, or any of various other electronic devices.

The computing system 1700 may further include a battery for supplying an operating voltage, and may further include an application chipset, a graphic-related module, a camera image processor (CIS), and a DRAM. As those skilled in the art can appreciate, the computing system 1700 may include other components.

The memory system 100 may be of various types including a type which stores data in a magnetic disk, such as a hard disk drive (HDD), and a type which stores data in a nonvolatile memory, such as a solid state drive (SDD), a universal flash storage (UFS) device or an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and/or an FRAM (ferroelectric RAM). In addition, the memory system 100 may be realized as any of various types of storage devices, and may be mounted in various electronic devices.

Although various embodiments of the disclosure have been illustrated and described, those skilled in the art will appreciate that various modifications, additions and substitutions are possible, without departing from the scope and spirit of the invention. Therefore, the disclosed embodiments are to be considered in a descriptive sense only, not for limiting the scope of the invention. The present invention encompasses all variations and modifications of any disclosed embodiment that fall within the scope of the claims including their equivalents.

What is claimed is:

1. A memory system comprising:
   a memory device including a plurality of memory areas; and
   a memory controller configured to control the memory device,
   wherein the memory controller includes a processor which includes one main core and a plurality of sub-cores which communicate with the main core and control write operations on one or more memory areas among the plurality of memory areas, wherein, in response to a target command which instructs an operation of writing target data to the memory device, the main core divides the target data into data units each having a size equal to or less than a threshold size and allocates the data units to the plurality of sub-cores, wherein the plurality of sub-cores stores a first data unit among the data units into corresponding memory areas such that the entire first data unit is written to the memory device or the entire first data unit is not written to the memory device, wherein the main core divides the first data unit into a plurality of sub-data units and distributes the sub-data units, wherein the sub-cores write the distributed sub-data data units to the corresponding memory areas, wherein a first sub-core among the plurality of sub-cores writes a first sub-data unit among the plurality of sub-data units to a target memory area which is controlled by the first sub-core, and wherein, when writing the first sub-data unit to the target memory area, the first sub-core writes an identification of the target command and a size value of the first sub-data unit.

2. The memory system according to claim 1, wherein each of the plurality of sub-cores independently controls write operations on the corresponding memory areas.

3. The memory system according to claim 1, wherein the identification of the target command and the size value of the first sub-data unit are written to each of a plurality of pages to which the first sub-data unit is written.

4. The memory system according to claim 3, wherein the identification of the target command and the size value of the first sub-data unit are written to a spare area where meta information for each of the plurality of pages is stored.

5. The memory system according to claim 1, wherein the first sub-core reports the identification of the target command to the main core when an uncorrectable error is detected in a piece of the first sub-data unit during a sudden power-off recovery (SPOR) operation.

6. The memory system according to claim 5, wherein the main core instructs, based on the identification of the target command, a second sub-core, different from the first sub-core among the plurality of sub-cores, to unmap a second sub-data unit which is written to memory area controlled by the second sub-core among the plurality of sub-data units.

7. A memory controller comprising:
a memory interface configured to communicate with a memory device including a plurality of memory areas; and
a control circuit configured to control the memory device,
wherein the control circuit includes a processor which include one main core and a plurality of sub-cores which communicate with the main core and control write operations on one or more memory areas among the plurality of memory areas,
wherein, in response to a target command for an operation of writing target data to the memory device, the main core divides the target data into data units each having a size equal to or less than a threshold size and allocates the data units to the plurality of sub-cores,
wherein the control circuit controls a first data unit among the data units such that the entire first data unit is written to the memory device or none of the entire first data unit is not written to the memory device,
wherein the main core divides the first data unit into a plurality of sub-data units and distributes the sub-data units,
wherein the sub-cores write the distributed sub-data data units to the memory areas,
wherein a first sub-core among the plurality of sub-cores writes a first sub-data unit among the plurality of sub-data units to a target memory area which is controlled by the first sub-core, and
wherein, when writing the first sub-data unit to the target memory area, the first sub-core writes an identification of the target command and a size value of the first sub-data unit.

8. The memory controller according to claim 7, wherein each of the plurality of sub-cores independently controls write operations on different memory areas.

9. The memory controller according to claim 7, wherein the identification of the target command and the size value of the first sub-data unit are written to each of a plurality of pages to which the first sub-data unit is written.

10. The memory controller according to claim 9, wherein the identification of the target command and the size value of the first sub-data unit are written to a spare area where meta information for each of the plurality of pages is stored.

11. The memory controller according to claim 7, wherein the first sub-core reports the identification of the target command to the main core when an uncorrectable error is detected in a piece of the first sub-data unit during a sudden power-off recovery (SPOR) operation.

12. The memory controller according to claim 11, wherein the main core instructs, based on the identification of the target command, a second sub-core different from the first sub-core among the plurality of sub-cores to unmap a second sub-data unit which is written to a memory area controlled by the second sub-core among the plurality of sub-data units.

13. A method for operating a memory controller including one main core and a plurality of sub-cores which communicate with the main core and control data write operations on one or more memory areas among a plurality of memory areas, the method comprising:
receiving, by the main core, a target command from a host for an operation of writing target data to a memory device;
dividing, by the main core, the target data into data units each having a size equal to or less than a threshold size and allocating, by the main core, the data units to the plurality of sub-cores; and
controlling, by the sub-cores, a first data unit among the data units such that the entire first data unit is written to the memory device or the entire first data unit is not written to the memory device,
wherein the main core divides the first data unit into a plurality of sub-data units and distributes the sub-data units,
wherein the sub-cores write the distributed sub-data data units to the corresponding memory areas,
wherein a first sub-core among the plurality of sub-cores writes a first sub-data unit among the plurality of sub-data units to a target memory area which is controlled by the first sub-core, and
wherein, when writing the first sub-data unit to the target memory area, the first sub-core writes an identification of the target command and a size value of the first sub-data unit.

* * * * *